United States Patent
Moccagatta et al.

(10) Patent No.: US 9,794,593 B1
(45) Date of Patent: Oct. 17, 2017

(54) VIDEO DECODER ARCHITECTURE FOR PROCESSING OUT-OF-ORDER MACRO-BLOCKS OF A VIDEO STREAM

(75) Inventors: Iole Moccagatta, Leuven (BE); Ignatius B. Tjandrasuwita, Atherton, CA (US); Harikrishna M. Reddy, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 899 days.

(21) Appl. No.: 11/299,054

(22) Filed: Dec. 9, 2005

(51) Int. Cl.
*H04B 1/66* (2006.01)
*H04N 19/64* (2014.01)

(52) U.S. Cl.
CPC .................... *H04N 19/64* (2014.11)

(58) Field of Classification Search
USPC ................................... 375/240.24
See application file for complete search history.

(56) References Cited

U.S. PATENT DOCUMENTS

| | | | |
|---|---|---|---|
| 5,084,791 A | 1/1992 | Thanos et al. | |
| 5,576,765 A | 11/1996 | Cheney et al. | |
| 5,598,222 A | 1/1997 | Lane | |
| 5,990,812 A | 11/1999 | Bakhmutsky | |
| 6,028,635 A | 2/2000 | Owen et al. | |
| 6,046,773 A * | 4/2000 | Martens et al. | 375/240.25 |
| 6,259,479 B1 | 7/2001 | Gadre et al. | |
| 7,142,225 B1 | 11/2006 | Boler et al. | |
| 7,209,643 B2 | 4/2007 | Sato et al. | |
| 7,224,837 B2 | 5/2007 | Olshansky et al. | |
| 7,236,525 B2 | 6/2007 | Pearson | |
| 7,239,662 B2 * | 7/2007 | Horowitz et al. | 375/240.24 |
| 7,590,059 B2 | 9/2009 | Gordon | |
| 2003/0131030 A1 * | 7/2003 | Sebot et al. | 708/209 |
| 2004/0155968 A1 | 8/2004 | Cheatle et al. | |
| 2004/0263361 A1 * | 12/2004 | Pearson | H04N 19/40 341/50 |
| 2005/0117653 A1 * | 6/2005 | Sankaran | 375/240.24 |
| 2005/0123057 A1 | 6/2005 | MacInnis et al. | |
| 2005/0259688 A1 | 11/2005 | Gordon | |
| 2006/0143669 A1 | 6/2006 | Cohen | |
| 2006/0215930 A1 | 9/2006 | Terui | |
| 2006/0227883 A1 * | 10/2006 | Citro | 375/240.29 |
| 2007/0014367 A1 * | 1/2007 | Zhou | 375/240.23 |

OTHER PUBLICATIONS

Non-Final OA Dated Dec. 19, 2008; U.S. Appl. No. 11/299,055.
Final OA Dated Jun. 16, 2009; U.S. Appl. No. 11/299,057.
Non-Final OA Dated Dec. 29, 2008; U.S. Appl. No. 11/299,055.
Final OA Dated Jul. 9, 2009; U.S. Appl. No. 11/299,055.
IBM; Reducing the Power Dissipation of Processors on Large CMOS Chips; IBM Technical Disclosure Bulletin; vol. 36, Issue 7; pp. 405-406; Jul. 1993.

* cited by examiner

*Primary Examiner* — Christopher S Kelley
*Assistant Examiner* — Jonathan Messmore

(57) ABSTRACT

A video decoder architecture for processing out-of-order macro-blocks of a video stream. A microcode engine receives compressed data representing macro-blocks of a frame of a video stream, wherein at least one macro-block is received out-of-order. The microcode engine is for buffering the compressed data and for ordering the macro-blocks of the frame in raster scan order. A digital video decoder receives the macro-blocks in raster scan order and is for decoding the macro-blocks.

24 Claims, 13 Drawing Sheets

200

250

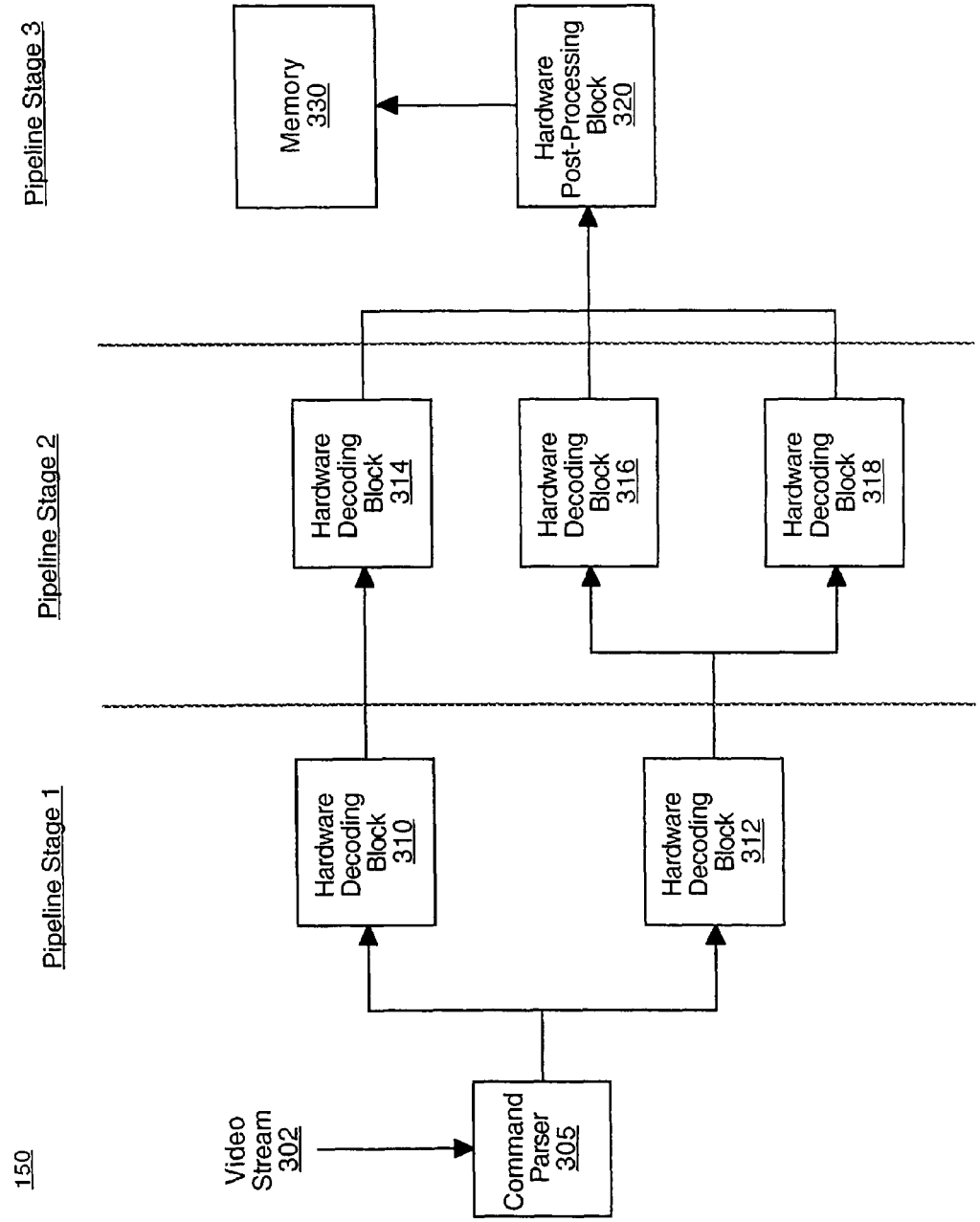

VIDEO DECODER ARCHITECTURE FOR PROCESSING OUT-OF-ORDER MACRO-BLOCKS OF A VIDEO STREAM

FIELD OF THE INVENTION

The field of the present invention pertains to video decoding. More particularly, the present invention relates to a video decoder architecture for processing out-of-order macro-blocks of a video stream.

BACKGROUND OF THE INVENTION

Digital video streams are typically encoded using one of many different encoding standards. For example, a digital video stream may be compressed for conversion into a data format that requires fewer bits. This compression can be lossless such that the original video stream can be recreated upon decoding or can be lossy such that an exact replica of the original video stream cannot be recreated, but where the decoding of the compressed data is more efficient.

There are currently a large number of video encoding standards, and new standards are frequently emerging. Examples of current video encoding standards include JPEG (Joint Photographic Experts Group), MPEG (Moving Pictures Experts Group), MPEG-2, MPEG-3, MPEG-4, H.263, H.263+, H.264, and proprietary standards such as Real Video and Windows Media. In most of the common video standards, the macro-blocks of a video stream are transmitted by the encoder in the raster scan order (e.g., left to right and top to bottom). However, the H.264 standard supports the transmission of macro-blocks in non-raster scan order. In addition, even if the encoder transmits the macro-blocks in the usual raster scan order, the same macro-blocks may be received at the decoder end in a different order, so the H.264 standard requires the decoder to handle this situation as well.

It is often desirable to perform post-processing operations on a decoded video stream to improve the quality of the stream. For example, a deblocking filter may be used to perform a deblocking operation on the video stream. Some deblocking filters perform deblocking operations on fully decoded frames of the video stream. These deblocking filters are referred to as out-of-loop deblocking filters, and are performed independent of the decoding of the video stream. Other deblocking filters performed deblocking operations at the macro-block level. These in-the-loop deblocking filters perform deblocking operations on macro-blocks after they are decoded. Moreover, in-the-loop deblocking filters can perform deblocking operations before the decoded macro-block is written to memory.

A typical in-the-loop deblocking filter operates on neighboring macro-block edges. If the macro-blocks are received in non-raster scan order, then the in-the-loop deblocking filter cannot be operated until all the macro-blocks of the frame are received and decoded. This requires that one frame has to be entirely decoded and stored in the memory and then the in-the-loop deblocking filter has to be applied. This further requires that one video frame of data has to be stored in the memory at an extra storage cost, and that for each video frame two video frames of additional memory bandwidth are required (one frame write and one frame read).

Accordingly, currently available digital video decoders require additional memory to support in-the-loop deblocking of macro-blocks. Thus, what is needed is a new digital video decoder architecture that overcomes the limitations on the prior art. The new digital video decoder should provide in-the-loop deblocking of a video stream without requiring additional memory for ordering the macro-blocks in raster scan order.

SUMMARY OF THE INVENTION

Embodiments of the present invention provide a video decoder architecture for providing in-the-loop deblocking of a video stream without requiring additional memory for ordering the macro-blocks in raster scan order. Embodiments of the present invention are capable of ordering macro-blocks of the video stream in the microcode engine. Embodiments of the present invention are capable of providing decoding and in-the-loop deblocking for a video stream encoded using one of a plurality of supported video standards.

In one embodiment, the present invention provides a video decoder architecture for processing out-of-order macro-blocks of a video stream. The video decoder architecture includes a microcode engine and a digital video decoder. The microcode engine is configured to receive compressed data representing macro-blocks of a frame of a video stream, wherein at least one macro-block is received out-of-order. The microcode engine is configured to buffer the compressed data and to order the macro-blocks of the frame in raster scan order. The digital video decoder is configured to receive the macro-blocks in raster scan order and to decode the macro-blocks. In one embodiment, the video decoder architecture is implemented within an integrated circuit coupled to a printed circuit board, in which the printed circuit board is coupled to a connector for removably coupling the printed circuit board to a computer system. In one embodiment, the video stream is encoded using H.264 video standard. In one embodiment, the microcode engine is operable to parse the video stream and to perform Variable Length Decoding (VLD) on the video stream.

In one embodiment, the digital video decoder is a hardware multi-standard video decoder device. A command parser of the hardware multi-standard video decoder device is operable to access a video stream and operable to identify a video encoding standard used for encoding the video stream. The hardware multi-standard video decoder device also includes a plurality of hardware decoding blocks for performing operations associated with decoding the video stream, wherein different subsets of the plurality of hardware decoding blocks are for decoding video streams encoded using different video encoding standards.

In one embodiment, the hardware multi-standard video decoder device further includes an in-the-loop deblocking filter for performing a macro-block-level deblocking operation on a decoded macro-block. In one embodiment, the microcode engine is operable to forward out-of-order macro-blocks to the digital video decoder if the video stream does not utilize the in-the-loop deblocking filter. In one embodiment, the hardware multi-standard video decoder device further comprises an out-of-loop filter for performing a frame-level post-processing operation on a decoded frame.

In another embodiment, the present invention provides a method for processing out-of-order macro-blocks of a video stream. Compressed data representing macro-blocks of a frame of a video stream is received, wherein at least one macro-block is received out-of-order. The compressed data is buffered. The macro-blocks of the frame are ordered in raster scan order. The compressed data representing the macro-blocks is decoded in the raster scan order.

In one embodiment, the method is implemented using a hardware multi-stream multi-standard video decoder device.

In one embodiment, a video standard used for encoding the video stream is identified. A subset of hardware decoding blocks of a plurality of hardware decoding blocks of the hardware multi-stream multi-standard video decoder device used for decoding the video streams are determined, in which different subsets of the plurality of hardware decoding blocks are operable for decoding video streams encoded using different video encoding standards. The video stream is decoded using the subset of hardware decoding blocks.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates a block diagram depicting the internal components of a hardware multi-standard video decoder device, in accordance with one embodiment of the present invention.

DETAILED DESCRIPTION OF THE INVENTION

Figure 1:
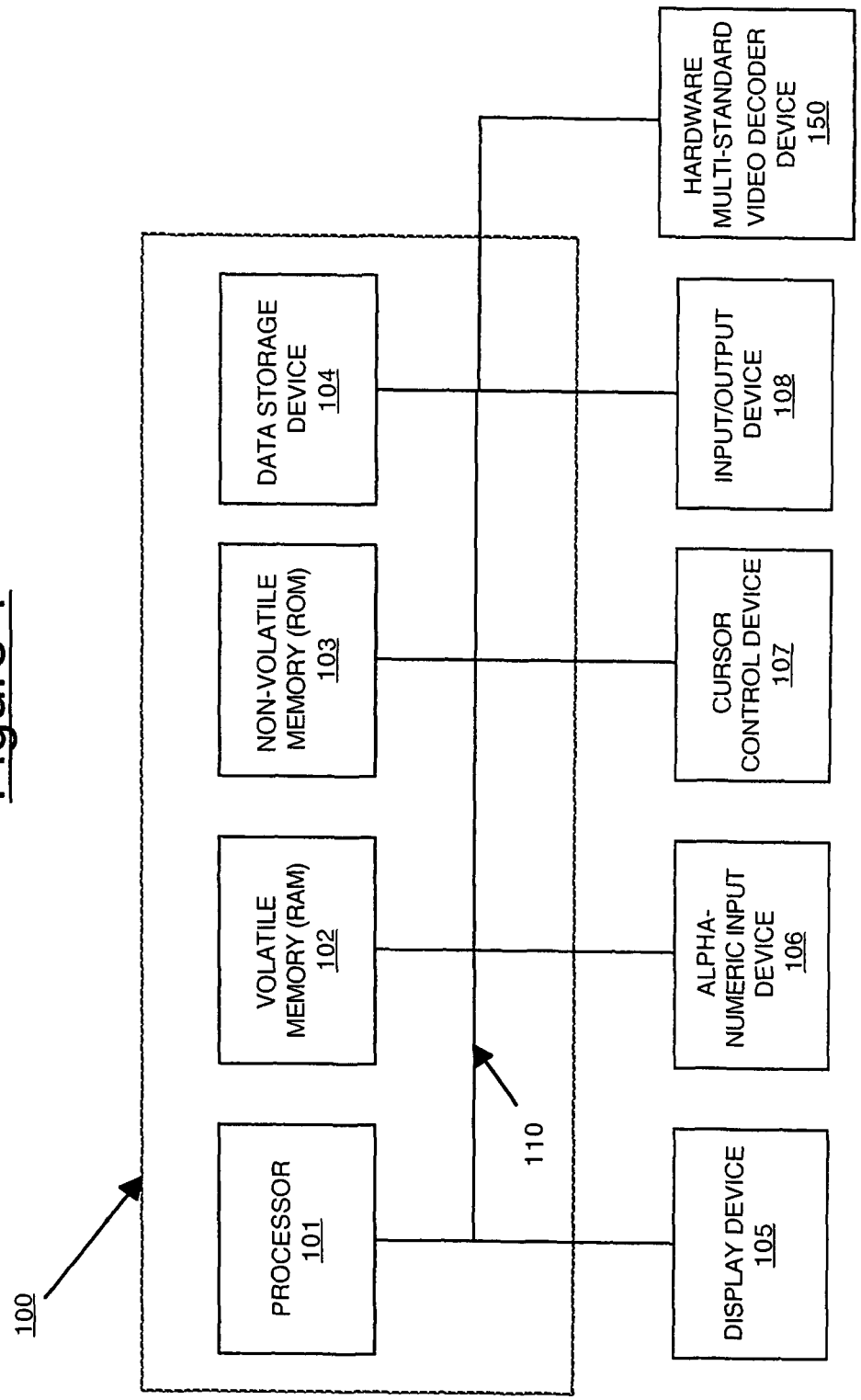
FIG. 1 illustrates an overview diagram of the basic components of a computer system, in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying" or "accessing" or "performing" or "decoding" or "activating" or "deactivating" or "determining" or "processing" or "receiving" or "buffering" or "ordering" or "forwarding" or "parsing" or "interleaving" or "rotating" or "repositioning" or "storing" or the like, refer to the action and processes of a hardware multi-standard video decoder device (e.g., hardware multi-standard video decoder device 150 of FIG. 3), a hardware multi-stream multi-standard video decoder device (e.g., hardware multi-stream multi-standard video decoder device 600 of FIG. 6), a microcode engine (e.g., microcode engine 260 of FIG. 2B), a rotation engine (e.g., rotation engine 450 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 illustrates an exemplary computer system 100 upon which embodiments of the present invention may be practiced. In general, computer system 100 comprises bus 110 for communicating information, processor 101 coupled with bus 110 for processing information and instructions, volatile memory 102, also referred to as random access memory (RAM), coupled with bus 110 for storing information and instructions for processor 101, and non-volatile memory 103, also referred to herein as read-only memory (ROM), coupled with bus 110 for storing static information and instructions for processor 101.

In one embodiment, computer system 100 comprises an optional data storage device 104 such as a magnetic or optical disk and disk drive coupled with bus 110 for storing information and instructions. In one embodiment, computer system 100 comprises an optional user output device such as display device 105 coupled to bus 110 for displaying information to the computer user, an optional user input device such as alphanumeric input device 106 including alphanumeric and function keys coupled to bus 110 for communicating information and command selections to processor 101, and/or an optional user input device such as cursor control device 107 coupled to bus 110 for communicating user input information and command selections to processor 101. Furthermore, an optional input/output (I/O) device 108 is used to couple computer system 100 onto, for example, a network.

In one embodiment, computer system 100 also comprises hardware multi-standard video decoder device 150, also referred to herein as decoder device 150, for decoding a video stream encoded using one a multiple video encoding standards. Decoder device 150 includes a plurality of hardware decoding blocks for performing decoding operations required by the multiple video encoding standards. It should be appreciated that decoder device 150 may be configured to decode video according to any combination of video encoding standards, including digital still images and digital movies. For example, decoder device 150 may be configured to decode video encoded using any of JPEG, MPEG-4, H.263, H.263+, H.264, and Windows Media (WMV9/VC-1) formats.

It should be appreciated that the decoder device 150 can be implemented as a discrete component, a discrete graphics card designed to couple to the computer system 100 via a connector (e.g., AGP slot, PCI-Express slot, etc.), a discrete integrated circuit die (e.g., mounted directly on the motherboard), or as an integrated decoder device included within the integrated circuit die of a computer system chipset component. Additionally, a local graphics memory can be included for decoder device 150 for data storage.

Figure 2A:
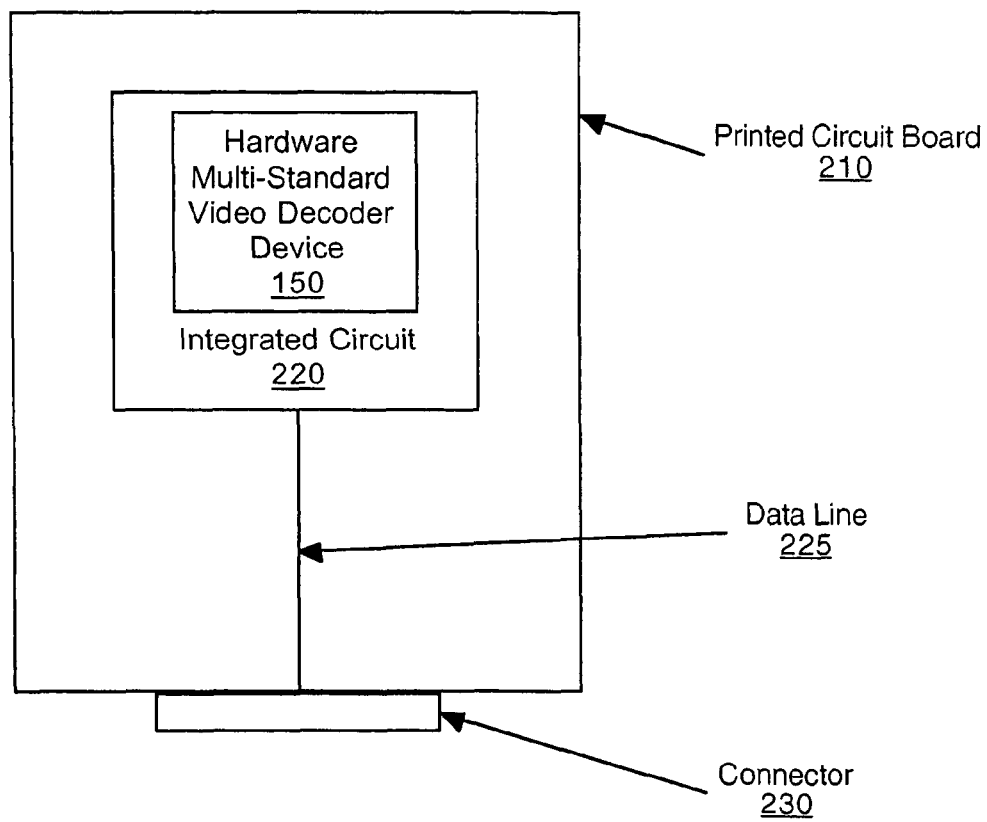
FIG. 2A illustrates a diagram of an exemplary hardware video decoder card implemented on a printed circuit board, in accordance with one embodiment of the present invention.

FIG. 2A illustrates a diagram of an exemplary hardware video decoder card 200 implemented on a printed circuit board, in accordance with one embodiment of the present invention. Hardware video decoder card 200 includes printed circuit board (PCB) 210, integrated circuit (IC) chip 220, data line 225, and connector 230. IC chip 220 includes hardware multi-standard video decoder device 150. Connector 230 is configured for coupling to a computer system (e.g., computer system 100 of FIG. 1) via a connector of the computer system (e.g., AGP slot, PCI-Express slot, etc.) Data line 225 is for communicating data (e.g., a bit stream) between the computer system and IC chip 220.

Figure 2B:
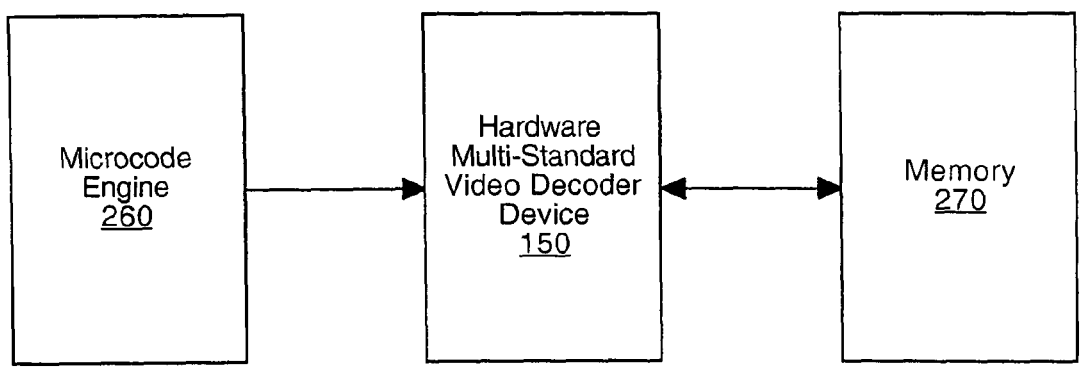
FIG. 2B illustrates a diagram of an exemplary architecture including a hardware multi-standard video decoder device, in accordance with one embodiment of the present invention.

FIG. 2B illustrates a diagram of an exemplary architecture 250 including a hardware multi-standard video decoder device 150, in accordance with one embodiment of the present invention. Architecture 250 includes microcode engine 260, hardware multi-standard video decoder device 150, and memory 270. In one embodiment, microcode engine 260 controls the operation of hardware multi-standard video decoder device 150. Microcode engine 260 includes operations hardware multi-standard video decoder device 150 must perform, acting as a translation layer between machine instruction and the hardware device decoder 150. In one embodiment, the bit-stream parsing and Variable Length Decoding (VLD) are done in microcode engine 260. Memory 270 is used by decoder device 150 to perform decoding and post-processing operations on received video streams. One embodiment of the operation memory 270 is described at memory 330 of FIG. 3.

With reference to FIG. 2B, in one embodiment, the present invention provides for reordering macro-blocks at microcode engine 260. As described below, decoder device 150 supports different post-processing operations, such as in-the-loop deblocking (e.g., at in-the-loop deblocking filter 440) and out-of-loop deblocking and/or deringing (e.g., at out-of-loop filter 442). In various embodiments, in-the-loop deblocking requires that the macro-blocks are received at the in-the-loop deblocking filter in raster scan order. However, certain video standards, such as H.264, support the transmission and receipt of macro-blocks in non-raster scan order. Accordingly, the present invention provides for ordering the macro-blocks in raster scan order to support in-the-loop deblocking for video standards that support transmitting and receiving macro-blocks in non-raster scan order.

In on embodiment, pre-processing operations are performed at microcode engine 260. In one embodiment, the bit-stream parsing and Variable Length Decoding (VLD) are done in microcode engine 260. Microcode engine 260 is configured to order the macro-blocks before sending them to the hardware decoder device 150. Microcode engine 260 buffers one frame of compressed data. In one embodiment, microcode engine 260 buffers one frame of run length encoded compressed data. In one embodiment, microcode engine 260 parses the incoming bit stream and then performs the VLD. If microcode engine 260 detects out-of-order macro-blocks it buffers the data and wait for all the macro-blocks to be received. Microcode engine 260 then orders the macro-blocks in raster scan order and send them to hardware decoder device 150.

By buffering the macro-blocks while the macro-blocks are still in compressed data, microcode engine 260 only needs to buffer a maximum of one frame of run length encoded compressed data which is a lot less than the decoded video data. Furthermore, buffering the compressed macro-blocks also saves power. Video streams received over the air are also subject to a lot of errors. Partitioning the bit stream parsing to microcode engine 260 also has the advantage of improving error recovery.

Hardware Multi-Standard Video Decoder Device Architecture

FIG. 3 shows a diagram depicting the internal components of the hardware multi-standard video decoder device 150 in accordance with one embodiment of the present invention. As illustrated in FIG. 3, the decoder device 150 includes a command parser 305, a plurality of hardware decoding blocks 310 through 318, hardware post-processing block 320, and memory 330. Decoder device 150 is operable to decode multiple video encoding standards.

Command parser 305 is for accessing a video stream 302 (e.g., a bit stream). Video stream 302 is a compressed video stream encoded according to one of multiple video encoding standards. It should be appreciated that video stream 302 may include digital still image data (e.g., JPEG encoded) or digital movie data (e.g., MPEG-4). In one embodiment, video stream 302 is received from a microcode engine (e.g., microcode engine 260 of FIG. 2B). Command parser 305 identifies a video encoding standard used for encoding video stream 302. In one embodiment, bit stream parsing and variable length decoding (VLD) are performed prior to command parser 305 accessing video stream 302. Bit stream parsing and VLD may be performed by the host CPU (e.g., processor 101 of FIG. 1) or a microcode engine (e.g., microcode engine 260 of FIG. 2B). Command parser 305 also controls the movement of data through decoder device 150 by controlling the clock cycles.

The plurality of hardware decoding blocks 310 through 318 are for performing operations associated with decoding said video stream. It should be appreciated that hardware decoding blocks 310 through 318 are representative of different decoding functions required to decode video streams according the video standards implemented within video decoder 150. Video encoding standards, such as MPEG-4, require particular operations are performed for decoding a video stream, such that all MPEG-4 decoders are able to decode MPEG-4 video streams. It should be appreciated that the operations required to perform decoding according to various standards are well-known to one skilled in the art.

In one embodiment, the hardware decoding blocks of decoder device 150 are configured to perform operations at the macro-block level (e.g., 8×8 pixel macro-block). However, it should be appreciated that decoder device 150 can include hardware decoding blocks that perform operations at other dimensional levels, such as the frame level.

Different subsets of hardware decoding blocks 310 through 318 are for decoding video streams encoded using different video encoding standards. For example, a first exemplary video standard requires the use of hardware decoding blocks 312 and 316 in decoding a video stream. A second exemplary video standard requires the use of hardware decoding blocks 310, 312, 314 and 318 in decoding a video stream. Accordingly, in various embodiments of the present invention, only those hardware decoding blocks required to decode a video stream are used in the decoding of a video stream encoded using the identified video standard.

In one embodiment, command parser 305 is operable to activate only those hardware decoding blocks required for the decoding of a received video stream, such that a hardware decoding block not associated with decoding said video stream is not activated. For example, a first subset of hardware decoding blocks (e.g., hardware decoding blocks 312 and 316) used for decoding a first identified video encoding standard are activated, such that hardware decoding blocks (e.g., hardware decoding blocks 310, 314 and 318) not associated with decoding the video stream are not activated. In another example, a second subset of decoding blocks (e.g., hardware decoding blocks 310, 312, 314 and 318) used for decoding a second identified video encoding standard are activated, such that a hardware decoding block (e.g., hardware decoding block 316) not associated with decoding said video stream is not activated. In one embodiment, command parser 305 is the only component of decoder device 150 that is active. Hardware decoding blocks are activated as needed according to the identified video standard and data flow.

In one embodiment, the hardware decoding blocks of decoder device 150 are implemented within a multiple stage macro-block level pipeline. As shown in FIG. 3, decoder device 150 is implemented as a three stage macro-block level pipeline, including pipeline stage 1 that includes hardware decoding blocks 310 and 312, and pipeline stage 2 that includes hardware decoding blocks 314, 316 and 318. In one embodiment, command parser 305 directs macro-block of video stream 302 into hardware decoding blocks of pipeline stage 1. In one embodiment, more than one macro-block can reside in pipeline stage 1, while pipeline stages 2 and 3 are limited to only one resident macro-block. In one embodiment, hardware decoding blocks 312, 316 and 318 are in a residue data path and hardware decoding blocks 310 and 314 are in a prediction data path. In one embodiment, the residue data path processes the error or differential data and the prediction path accesses the data associated with the previous frame or macro-block.

In one embodiment, command parser 305 is operable to deactivate hardware decoding blocks within one stage of the multiple stage macro-block level pipeline if no data of said video stream is received at the stage. For example, in the decoding of video stream 302, as the last data for video stream 302 leaves pipeline stage 1, and no data is received at pipeline stage 1, all hardware decoding blocks of pipeline stage 1 are deactivated. Thus, additional power savings is achieved by deactivating all hardware decoding blocks of a pipeline stage, even those hardware decoding blocks are required for the video standard associated with video stream 302.

In one embodiment, video stream 302 does not go in or out of memory 330 until it is fully decoded. It should be appreciated that memory 330 may be an external memory unit (e.g., volatile memory 102 or non-volatile memory 103 of FIG. 1) or an embedded memory unit of decoder device 150. By not accessing memory 330 until after fully decoding video stream 302, decoder device 150 uses less power.

In one embodiment, decoder device 150 further includes hardware post-processing block 320 for performing a post-processing operation on a decoded video stream. In one embodiment, hardware post-processing block 320 includes a deblocking filter. It should be appreciated that the deblocking filter may be an in-the-loop deblocking filter or an out-of-loop deblocking and/or deringing filter. The in-the-loop deblocking filter performs deblocking operations before accessing memory 330. The out-of-loop deblocking and deringing filter performs deblocking and deringing operations on data accessed from memory 330. However, it should be appreciated that hardware post-processing block 320 can perform any type of post-processing operation. Moreover, there can be any number of hardware post-processing blocks 320 to perform multiple post-processing operations.

In one embodiment, command parser 305 is operable to deactivate all hardware decoding blocks if video stream 302 is a decoded video stream such that hardware post-processing block 320 performs a post-processing operation on the decoded video stream. In other words, decoder device 150 may also be used only as a hardware post-processing device. If a decoded video stream is received at decoder device 150, all hardware decoding blocks are deactivated, and a post-processing operation on the decoded video stream.

Figure 4:
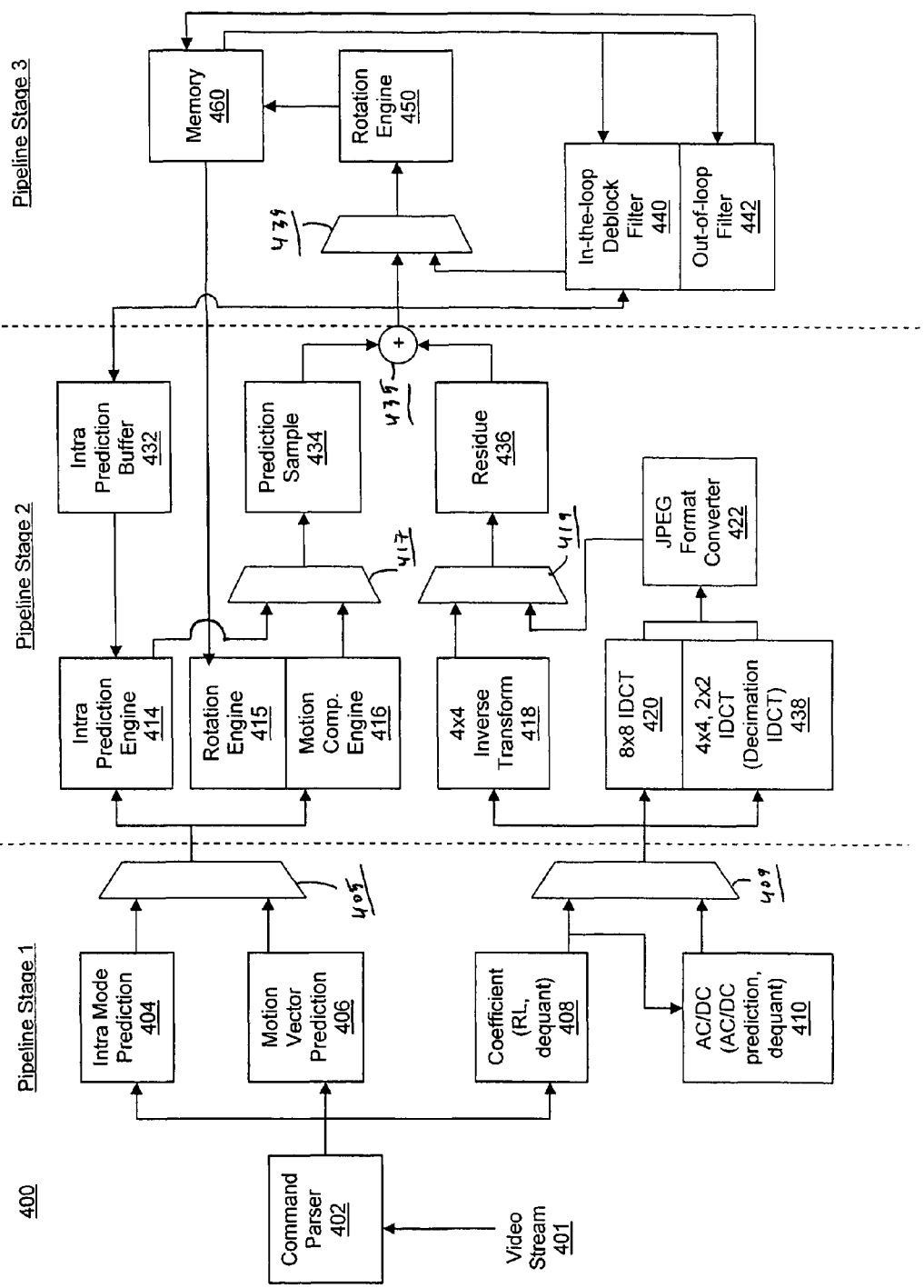
FIG. 4 illustrates a block diagram depicting internal components of an exemplary hardware multi-standard video decoder device, in accordance with one embodiment of the present invention.

FIG. 4 illustrates a block diagram depicting internal components of an exemplary hardware multi-standard video decoder device 400, also referred to as decoder device 400, in accordance with one embodiment of the present invention. Decoder device 400 is configured to operate as any one of a JPEG, MPEG-4, H.263, H.263+, H.264 or WMV9/VC-1 decoders. Accordingly, decoder device 400 includes hardware decoding blocks for performing all decoding operations necessary for decoding video streams encoded using any one of the JPEG, MPEG-4, H.263, H.263+, H.264 or WMV9/VC-1 standards. However, it should be appreciated that the present invention is flexible in support of other video standards, and that the present invention is not intended to be limited to the embodiment described in FIG. 4.

As illustrated in FIG. 4, the decoder device 400 includes a command parser 402, a plurality of hardware decoding blocks, a plurality of hardware post-processing blocks, and memory 460. Command parser 402 is for accessing a video stream 401 (e.g., a bit stream). It should be appreciated that video stream 401 may include digital still image data (e.g., JPEG encoded) or digital movie data (e.g., MPEG-4). In one embodiment, video stream 401 is received from a microcode engine (e.g., microcode engine 260 of FIG. 2B). Video stream 401 is a compressed video stream encoded according to one of multiple video encoding standards. Command parser 402 identifies a video encoding standard used for encoding video stream 401. In one embodiment, bit stream parsing and variable length decoding (VLD) are performed prior to command parser 402 accessing video stream 401. Bit stream parsing and VLD may be performed by the host CPU (e.g., processor 101 of FIG. 1) or a microcode engine. It should be appreciated that if video stream 401 is encoded using a video standard other than those for which decoder device 400 is configured to decode, no decoding operations are performed. In one embodiment, command parser 402 sends an indication to the computer system indicating that decoding cannot be performed on video stream encoded using a non-supported standard.

Upon identifying the video standard used for encoding video stream 401, command parser 402 directs macroblocks of video stream 401 to the appropriate hardware decoding blocks for the identified video standard. In one embodiment, command parser activates the appropriate hardware decoding blocks for the identified video standard, such that hardware decoding blocks not required for the identified video standard are deactivated. Command parser 402 also controls the movement of data through decoder device 400 by controlling the clock cycles. In one embodiment, command parser 402 is the only component of decoder device 400 that is active. Hardware decoding blocks are activated as needed according to the identified video standard and data flow.

The hardware decoding blocks of decoder device 400 include Intra prediction mode engine 404, motion vector (MV) prediction engine 406, coefficient (e.g., run length (RD) or de-quantization) engine 408, AC/DC (e.g., AC/DC prediction or de-quantization) prediction engine 410, Intra prediction engine 414, rotation engine 415, motion compensation engine 416, 4×4 inverse transform engine 418, 8×8 inverse discrete cosine transformation (IDCT) engine 420, IDCT format converter engine 422, Intra prediction buffer 432, prediction sample 434 and residue block 436. Decoder device 400 further includes multiplexers 405, 409, 417, 419, 439 and adder 435. Decoder device 400 also optionally includes hardware post-processing blocks: in-the-loop deblocking filter 440, out-of-loop filter 442, and rotation engine 450.

Decoder device 400 is implemented within as a three-stage macro-block level pipeline having a residue path and a prediction path. In one embodiment, more than one macro-block can reside in pipeline stage 1, while pipeline stages 2 and 3 are limited to only one resident macro-block. The residue path includes coefficient engine 408, AC/DC prediction engine 410, 4×4 inverse transform engine 418, 8×8 IDCT engine 420, IDCT format converter engine 422 and residue block 436. The prediction path includes Intra prediction mode engine 404, MV prediction engine 406, Intra prediction engine 414, rotation engine 415, motion compensation engine 416, Intra prediction buffer 432 and prediction sample 434.

As described above, decoder device 400 is operable to decode video streams according to any of the JPEG, MPEG-4, H.263, H.263+, H.264 or WMV9/VC-1 standards. The described hardware decoding blocks perform all decoding operations required according to the supported standards. The specific operations of the hardware decoding blocks are well-known and understood by one skilled in the art, as the operations are described in each of the standards. Accordingly, the specific operations of the hardware decoding blocks are not described in detail herein.

In one embodiment, MV parameters and Intra prediction parameters are passed to MV prediction engine 406 and Intra prediction mode engine 404, respectively, in the prediction path. These engines compute the actual motion vectors or the Intra prediction mode based on the programmed video standard and passes them to motion compensation engine 416 or Intra prediction engine 414, respectively. Motion compensation engine 416 or Intra prediction engine 414 computes the predicted data. In one embodiment, motion compensation engine 416 includes rotation engine 415. Rotation engine 415 is for rotating a reference frame to align with an incoming video frame. Rotation engine 415 is activated whenever motion compensation engine is used in the decoding of a video stream. Meanwhile, the error data is processed in the required subset of coefficient engine 408, AC/DC prediction engine 410, 4×4 inverse transform engine 418, 8×8 IDCT engine 420 and IDCT format converter engine 422

The recovered error data is added to the predicted data and is then further passed to the pipeline stage 3. The resulting data is further processed, if necessary, and is written to memory 460 to be displayed. In-the-loop deblocking filter is used in the H264 and WMV9/VC-1 modes. In the WMV9/VC-1 mode, in-the-loop deblocking filter 440 is used to implement the overlap smoothing filter. Out-of-loop filter 442 can be used on any video stream to improve the quality of the decoded image. In one embodiment, out-of-loop filter 442 runs simultaneously with the rest of decoder device 400. Out-of-loop filter 442 should be triggered after a frame is decoded into memory 460. The decoded image can also be rotated before writing to memory 460 in the pipeline stage 3 at rotation engine 450.

Exemplary Operation of Hardware Multi-Standard Video Decoder Device for the Supported Video Standards The following embodiments describe the operation of decoder device 400 for each of the supported video standards:

JPEG:

JPEG decoding does not require hardware decoding blocks of the prediction path because JPEG video streams are for recreating a digital still image. Therefore, Intra prediction mode engine 404, MV prediction engine 406, Intra prediction engine 414, rotation engine 415, motion compensation engine 416, Intra prediction buffer 432 and prediction sample 434 are all deactivated for JPEG decoding. Also, JPEG decoding does not require 4×4 inverse transform engine 418, which is thus deactivated. Command parser 402 activates coefficient engine 408, AC/DC prediction engine 410, 8×8 IDCT engine 420, Decimation IDCT engine 438, IDCT format converter engine 422 and residue block 436. Command parser 402 routes data from video stream 401 through the active hardware decoding blocks for decoding a JPEG encoded video stream. It should be appreciated that the operations performed by hardware decoding blocks and the sequence of the operations are mandated by the JPEG standard.

JPEG decoding only requires the use of one of 8×8 IDCT engine 420 and decimation IDCT engine 438. In one embodiment, command parser 402 is operable to identify which of 8×8 IDCT engine 420 and decimation IDCT engine 438 is activated for the video stream. 8×8 IDCT engine 420 is activated for fully decoding the video stream, while decimation IDCT engine 438 is activated where the video stream indicates decimation. IDCT format converter engine 422 is operable to perform format conversion. For example, IDCT format converter engine 422 can perform format conversion between any of the following formats: YUV 4:4:4, YUV 4:2:2, YUV 4:2:2 R, and YUV 4:2:0. It should be appreciated that other format conversions may also be performed, and that IDCT format converter engine 422 is not limited to the listed formats.

A decoded JPEG video stream exits pipeline stage 2. In one embodiment, the decoded JPEG video stream is stored in memory 330. In another embodiment, post-processing operations are performed on the decoded JPEG video stream prior to storing in memory 330.

MPEG-4/H.263:

MPEG-4 and H.263 decoding are very similar to each other for purposes of decoder device 400. In particular, the MPEG-4 standard requires that MPEG-4 decoders are operable to decode H.263 encoded video streams. MPEG-4 and H.263 decoding does not require Intra prediction mode engine 404, Intra prediction engine 414, IDCT format converter engine 422, and 4×4 inverse transform engine 418, which are deactivated. Furthermore, in-the-loop deblocking filter 440 is also deactivated for post-processing operations. Accordingly, command parser activates MV prediction engine 406, coefficient engine 408, AC/DC prediction engine 410, rotation engine 415, motion compensation engine 416, 8×8 IDCT engine 420, Intra Prediction buffer 432, prediction sample 434 and residue block 436. Command parser 402 routes data from video stream 401 through the active hardware decoding blocks for decoding an MPEG-4 or H.263 encoded video stream. It should be appreciated that the operations performed by hardware decoding blocks and the sequence of the operations are mandated by the MPEG-4 and H.263 standards.

Command parser 402 is operable to direct macro-blocks to the appropriate residue path or prediction path hardware decoding blocks. In one embodiment, Intra frames (I-frames) can be processed at coefficient engine 408 and AC/DC prediction engine 410 of the residue path simultaneously with Prediction frames (P-frames) being processed at MV prediction engine 406 within pipeline stage 1. The I-frames and P-frames are synchronized at pipeline stage 2. Command parser 402 is also operable to activate the appropriate hardware decoding blocks of 8×8 IDCT engine 420.

A decoded MPEG-4/H.263 video stream exits pipeline stage 2. In one embodiment, the decoded MPEG-4/H.263 video stream is stored in memory 330. In another embodiment, post-processing operations are performed on the decoded MPEG-4/H.263 video stream, prior to storing in memory 330. In another embodiment, post-processing operations are performed on the decoded MPEG-4/H.263 video stream at out-of-loop filter 442. In one embodiment, out-of-loop filter 442 is a deblocking filter. In another embodiment, out-of-loop filter 442 is a deringing filter. In another embodiment, out-of-loop filter 442 is both a deblocking filter and a deringing filter. It should be appreciated that out-of-loop filter 442 can be implemented as any deblocking and/or deringing filter.

H.263+:

H.263+ decoding is similar to MPEG-4/H.263 decoding as described above. H.263+ shifts a portion of the decoding operation into the VLD, which is performed before command parser 402 accesses video stream 401. In addition to not requiring, and thus deactivating, Intra prediction mode engine 404, Intra prediction engine 414, 4×4 inverse transform engine 418 and out-of-loop filter 442, command parser 402 also deactivates coefficient engine 408 and AC/DC prediction engine 410. Otherwise, H.263+ decoding is similar to MPEG-4/H.263 decoding as described above. It should be appreciated that the operations performed by hardware decoding blocks and the sequence of the operations are mandated by the H.263+ standard.

H.264:

H.264 decoding does not require AC/DC prediction engine 410, 8×8 IDCT engine 420 and IDCT format converter engine 422, which are deactivated. Accordingly, command parser 402 activates Intra prediction mode engine 404, MV prediction engine 406, coefficient engine 408, Intra prediction engine 414, rotation engine 415, motion compensation engine 416, 4×4 inverse transform engine 418, Intra prediction buffer 432, prediction sample 434 and residue block 436. Intra prediction buffer 432 is operable to store the top row of pixels from the previous macro-block such that Intra prediction engine 414 can access the previous "leveling" pixels when processing the next row of macro-blocks. Command parser 402 routes data from video stream 401 through the active hardware decoding blocks for decoding an H.264 encoded video stream. It should be appreciated that the operations performed by hardware decoding blocks and the sequence of the operations are mandated by the H.264 standard.

Command parser 402 is operable to direct macro-blocks to the appropriate residue path or prediction path hardware decoding blocks. In one embodiment, frames can be processed at the residue path and the prediction path simultaneously within pipeline stage 1. The frames are synchronized at pipeline stage 2.

A decoded H.264 video stream exits pipeline stage 2. In one embodiment, in-the-loop post-processing operations are performed on the decoded H.264 video stream, prior to storing in memory 330. In another embodiment, out-of-loop post-processing operations are performed on the decoded H.264 video stream at out-of-loop filter 442. It should be appreciated that out-of-loop filter 442 can be implemented as any deblocking filter and/or deringing filter.

WMV9/VC-1:

WMV9/VC-1 decoding does not require Intra prediction mode engine 404 and Intra prediction engine 414, which are deactivated. Accordingly, command parser 402 activates MV prediction engine 406, coefficient engine 408, AC/DC prediction engine 410, rotation engine 415, motion compensation engine 416, 4×4 inverse transform engine 418, 8×8 IDCT engine 420, Intra prediction buffer 432, prediction sample 434 and residue block 436. Command parser 402 routes data from video stream 401 through the active hardware decoding blocks for decoding a WMV9/VC-1 encoded video stream. It should be appreciated that the operations performed by hardware decoding blocks and the sequence of the operations are mandated by the WMV9/VC-1 standard.

Command parser 402 is operable to direct macro-blocks to the appropriate residue path or prediction path hardware decoding blocks. In one embodiment, frames can be processed at the residue path and the prediction path simultaneously within pipeline stage 1. The frames are synchronized at pipeline stage 2.

A decoded WMV9/VC-1 video stream exits pipeline stage 2. In one embodiment, in-the-loop post-processing operations are performed on the decoded WMV9/VC-1 video stream, prior to storing in memory 330. In one embodiment, in-the-loop deblocking filter 440 is used to implement an overlap smoothing filter. In another embodiment, post-processing operations are performed on the decoded WMV9/VC-1 video stream at out-of-loop filter 442. It should be appreciated that out-of-loop filter 442 can be implemented as any deblocking and/or deringing filter.

Post-Processing Operations

Pipeline stage 3 of decoder device 400 includes three hardware post-processing blocks: in-the-loop deblocking filter 440, out-of-loop filter 442, and rotation engine 450. In-the-loop deblocking filter 440 is used in the H.264 and WMV9/VC-1 modes. In one embodiment, in the WMV9/VC-1 mode, in-the-loop deblocking filter 440 is used to implement the overlap smoothing filter.

Out-of-loop filter 442 can be used on any video stream to improve the quality of the decoded image. In one embodiment, out-of-loop filter 442 runs simultaneously with the rest of decoder device 400. Out-of-loop filter 442 should be triggered after a frame is decoded into memory 460.

It should be appreciated that any deblocking and/or deringing filter can be used for out-of-loop filter 442. For example, the International Organization for Standardization (ISO), the organization for overseeing many of the video standards that may be implemented in device 150, often includes suggested deblocking filters in the standardization publications. For instance out-of-loop filter 442 may include the deblocking filter described in ISO publication ISO/IEC 14496-2:2001, section F.3.1.

The decoded image can also be rotated before writing to memory 460 in the pipeline stage 3 at rotation engine 450. Rotation engine 450 is configured to provide on-the-fly macro-block rotation, where individual macro-blocks are rotated and placed in a new position of the frame, based on an indicated degree of rotation. Refer to the discussion of FIGS. 10A, 10B and 11 below for a detailed discussion of the operation of rotation engine 450.

Figure 5:
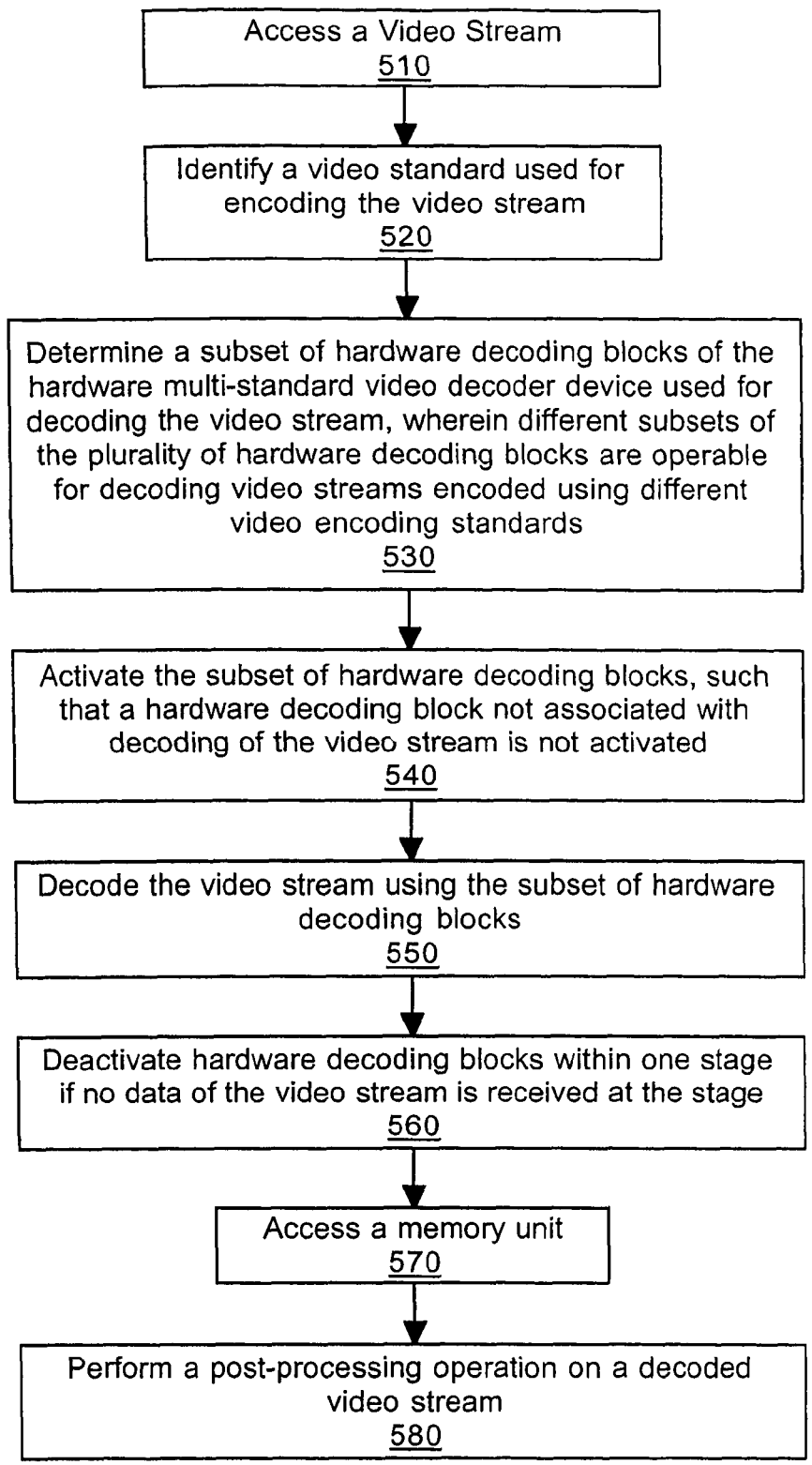
FIG. 5 illustrates a flow chart of a method for decoding a video stream, wherein the method is implemented using a hardware multi-standard video decoder device, in accordance with an embodiment of the present invention.

Method for Decoding a Video Stream Using a Hardware Multi-Standard Video Decoder Device FIG. 5 illustrates a flow chart of a method 500 for decoding a video stream, wherein the method is implemented using a hardware multi-standard video decoder device, in accordance with an embodiment of the present invention. Although specific steps are disclosed in method 500, such steps are exemplary. That is, the embodiments of the present invention are well suited to performing various other steps or variations of the steps recited in FIG. 5. In one embodiment, method 500 is performed by decoder device 150 of FIG. 3.

At step 510 of process 500, a video stream is accessed. At step 520, a video standard used for encoding the video stream is identified. The hardware multi-standard video decoder device is configured to decode the video stream according to a plurality of video standards.

At step 530, a subset of hardware decoding blocks of a plurality of hardware decoding blocks of the hardware multi-standard video decoder device used for decoding the video stream is determined. Different subsets of the plurality of hardware decoding blocks are operable for decoding video streams encoded using different video encoding standards. In one embodiment, as shown at step 540, the subset of hardware decoding blocks is activated, such that a hardware decoding block not associated with decoding of the video stream is not activated.

At step 550, the video stream is decoded using the subset of hardware decoding blocks. In one embodiment, as shown at step 560, hardware decoding blocks within one stage of a multiple stage macro-block level pipeline are deactivated if no data of the video stream is received at the stage. It should be appreciated that step 540 and 560 provide additional power savings, and are optional.

At step 570, a memory unit is accessed subsequent decoding the video stream. In one embodiment, the decoded video stream is stored in the memory for display. In one embodiment, as shown at step 580, a post-processing operation on a decoded video stream. It should be appreciated that the post-processing operation may be performed before or after step 570 is performed. In one embodiment, the decoded video stream is rotated. In another embodiment, and in-the-loop deblocking filter is applied to the decoded video stream. The rotation and in-the-loop deblocking are performed before the memory unit is accessed. In one embodiment, out-of-loop deblocking and deringing filters are applied to the decoded video stream after the memory unit is accessed.

Decoding Multiple Streams Encoded Using Different Video Standards Using a Hardware Multi-Standard Video Decoder Device Embodiments of the hardware multi-standard video decoder device of the present invention are also operable to decode multiple video streams concurrently. Portions of the video streams are interleaved, such as macro-blocks or frames. The decoder device accesses the interleaved portions serially. Accordingly, the decoder device performs decoding operations on the interleaved portions. For example, a decoding operation can be performed on macro-blocks of two video streams. The video streams are interleaved such that macro-blocks of the video streams alternate. Each clock cycle, the decoding operation may be performed on an alternating video stream.

Figure 6:
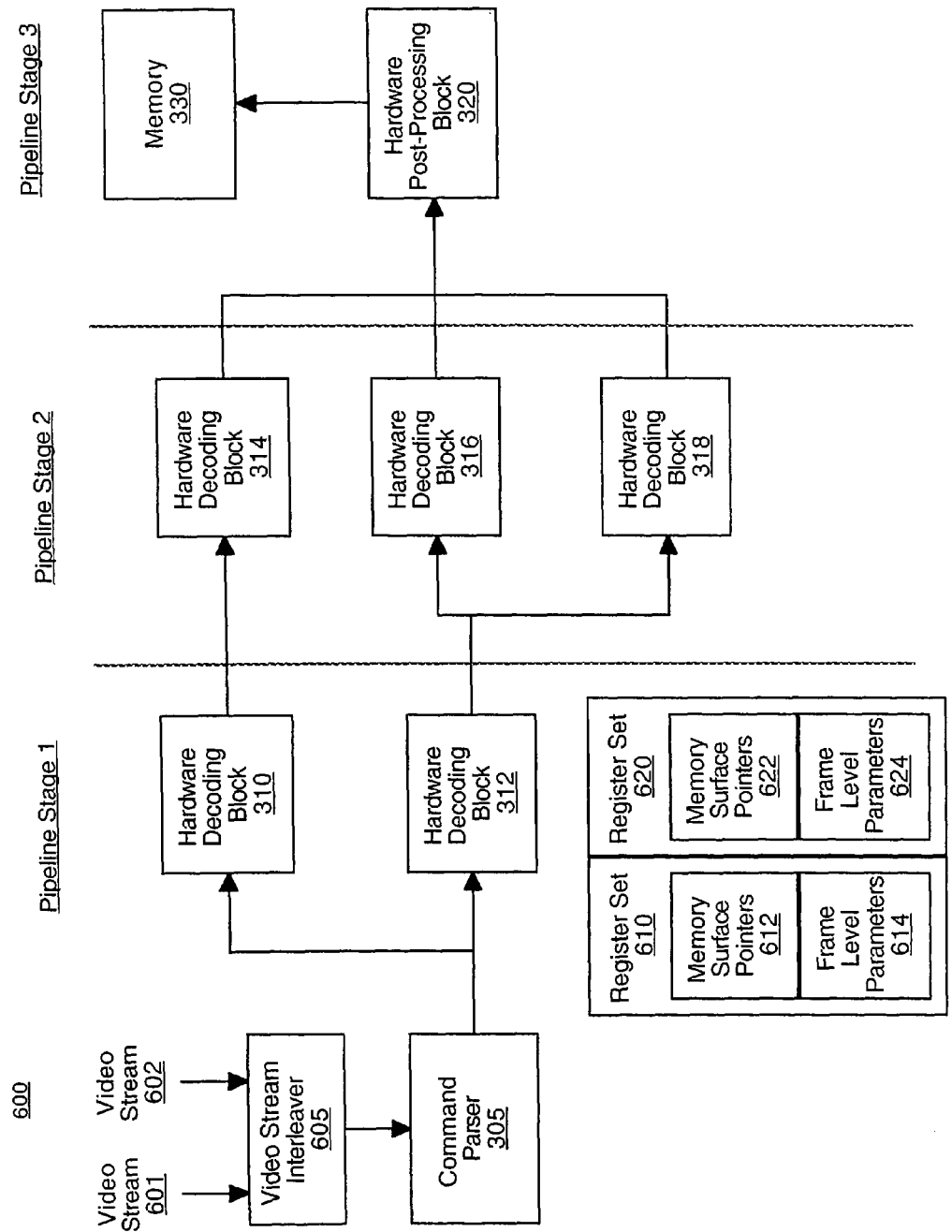
FIG. 6 shows a diagram depicting the internal components of the hardware multi-stream multi-standard video decoder device, in accordance with one embodiment of the present invention.

FIG. 6 shows a diagram depicting the internal components of the hardware multi-stream multi-standard video decoder device 600 in accordance with one embodiment of the present invention. As illustrated in FIG. 6, the decoder device 600 includes a video stream interleaver 605, a command parser 305, a plurality of hardware decoding blocks 310 through 318, hardware post-processing block 320, memory 330, register set 610 and register set 620. Decoder device 600 is operable to decode multiple video encoding standards, and operates in a many similar to decoder device 150 of FIG. 3. Decoder device 600 differs from decoder device 150 in that register sets 610 and 620 allow decoder device 600 to decode multiple video streams concurrently.

Video stream interleaver 605 is operable to access multiple video streams and to interleave portions of the video streams. As shown, video stream interleaver 605 accesses video streams 601 and 602. However, it should be appreciated that video stream interleaver 605 is operable to receive any number of video streams, and is not limited to the embodiment shown in FIG. 6. In one embodiment, video streams 601 and 602 are received from a microcode engine (e.g., microcode engine 260 of FIG. 2B).

Figure 7A:
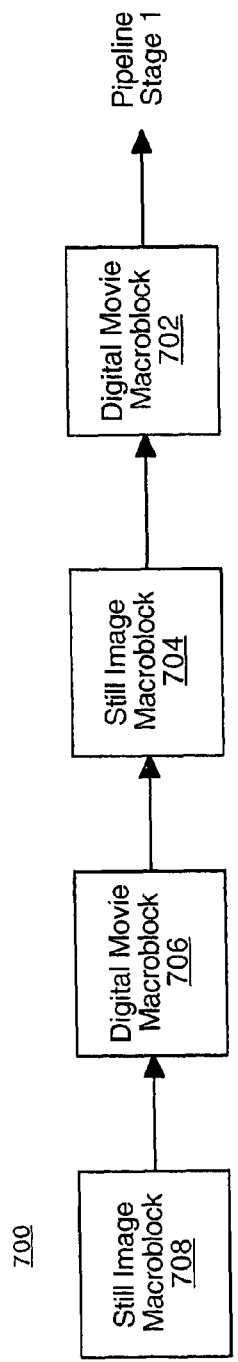
FIGS. 7A and 7B show diagrams depicting exemplary interleaved portions of multiple video streams, in accordance with embodiments of the present invention.
Figure 7B:
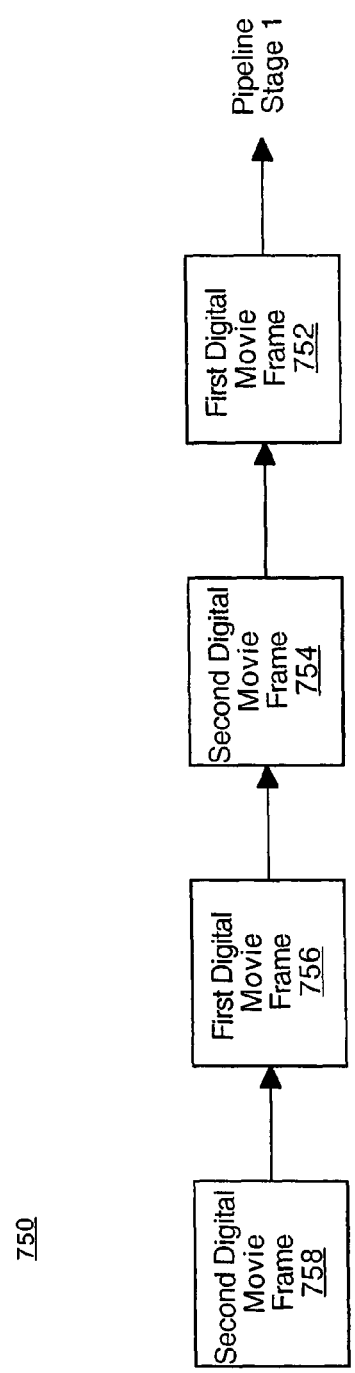

FIGS. 7A and 7B show diagrams depicting exemplary interleaved portions of multiple video streams, in accordance with embodiments of the present invention. With reference to FIG. 7A, two interleaved video streams are shown, wherein one stream is a still image video stream (e.g., JPEG) and the other stream is a digital movie stream (e.g., MPEG-4). As shown, where the video streams include only one digital movie stream, the video streams can be interleaved at the macro-block level. In particular, still image macro-blocks 704 and 708 are interleaved with digital movie macro-blocks 702 and 706, such that macro-blocks from each video stream alternate within an interleaved stream 700. Where video streams are interleaved at the macro-block level, a software driver of decoder device 600 buffers macro-block data in the system memory to manage the decoding of the interleaved video streams.

With reference to FIG. 7B, two interleaved video streams are shown, wherein both streams are digital movie streams. As shown, where the video streams include multiple digital movie streams, the video streams are interleaved at the frame level. In particular, first digital movie frames 752 and 756 are interleaved with second digital movie frames 754 and 758, such that frames from each video stream alternate within an interleaved stream 750. Where video streams are interleaved at the frame level, a software driver of decoder device 600 buffers frame data in the system memory to manage the decoding of the interleaved video streams.

With reference to FIG. 6, command parser 305, hardware decoding blocks 310 through 318, hardware post-processing block 320 and memory 330 operate as described in FIG. 3. The residue data and the other decoder parameters are passed to decoder device through the command parser 305. Data from the command parser 305 will be routed to either the residue path (hardware decoding blocks 312, 316 and 318) or the prediction path (hardware decoding blocks 310 and 314). The residue path will process the error or the differential data where as the prediction path will prepare/fetch the previous frame's or previous macro-block's data.

In order to manage the decoding of interleaved video streams, two register sets 610 and 620 are maintained in the pipeline stage 1. In one embodiment, register sets 610 and 620 store the memory surface pointers 612 and 622, respectively, and the frame level parameters 614 and 624, respectively. Each of the register sets is used to store the parameters associated with one of the video streams. For example, register set 610 is used to store parameters associated with video stream 601 and register set 620 is used to store parameters associated with video stream 602. Once either a portion of one video stream is processed in the pipeline stage 1, the appropriate parameters are passed with the residue or the predicted data to the downstream pipeline stage 2 and 3 in the form of packets. The decoded data will be routed to the appropriate area in the memory based on whether the macro-block is of still image or digital movie type. It should be appreciated that decoder device 600 may be configured to decode any number of video streams by adding the appropriate number of register sets, such that each stream to be decoded has an associated register set.

Figure 8:
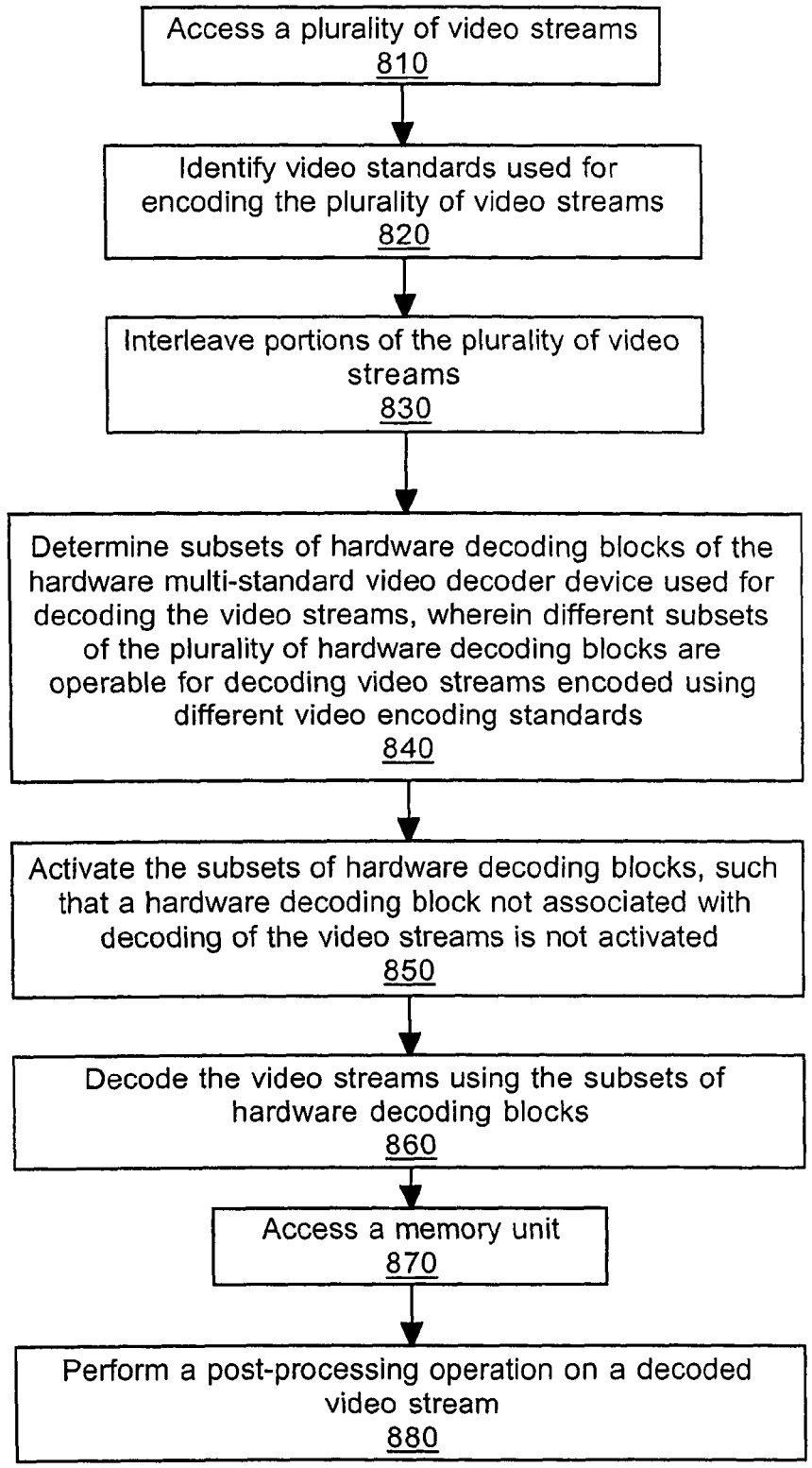
FIG. 8 illustrates a flow chart of a method for decoding multiple video streams, wherein the method is implemented using a hardware multi-stream multi-standard video decoder device, in accordance with an embodiment of the present invention.

FIG. 8 illustrates a flow chart of a method 800 for decoding multiple video streams, wherein the method is implemented using a hardware multi-stream multi-standard video decoder device, in accordance with an embodiment of the present invention. Although specific steps are disclosed in method 800, such steps are exemplary. That is, the embodiments of the present invention are well suited to performing various other steps or variations of the steps recited in FIG. 8. In one embodiment, method 800 is performed by decoder device 600 of FIG. 6.

At step 810 of process 800, a plurality of video streams is accessed. At step 820, video standards used for encoding the video streams are identified. The hardware multi-stream multi-standard video decoder device is configured to decode the video streams according to a plurality of video standards. At step 830, portions of the video streams are interleaved. In one embodiment, where the video streams include only one digital movie stream, macro-blocks of the video streams are interleaved. In another embodiment, where the video streams include multiple digital movie streams, frames of the video streams are interleaved. It should be appreciated that steps 820 and 830 can be performed in any order.

At step 840, subsets of hardware decoding blocks of a plurality of hardware decoding blocks of the hardware multi-standard video decoder device used for decoding the plurality of video streams are determined. Different subsets of the plurality of hardware decoding blocks are operable for decoding video streams encoded using different video encoding standards. In one embodiment, as shown at step 850, the subsets of hardware decoding blocks are activated, such that a hardware decoding block not associated with decoding of the video streams is not activated.

At step 860, the video streams are decoded using the subsets of hardware decoding blocks. At step 870, a memory unit is accessed subsequent decoding the video streams. In one embodiment, the decoded video stream is stored in the memory for display. In one embodiment, as shown at step 880, a post-processing operation on at least one decoded video stream. It should be appreciated that the post-processing operation may be performed before or after step 870 is performed. In one embodiment, the decoded video stream is rotated. In another embodiment, and in-the-loop deblocking filter is applied to the decoded video stream. The rotation and in-the-loop deblocking are performed before the memory unit is accessed. In one embodiment, out-of-loop deblocking and deringing filters are applied to the decoded video stream after the memory unit is accessed.

Processing Out-of-Order Macro-Blocks of a Video Stream

With reference to FIG. 2B, in one embodiment, the present invention provides for buffering and reordering macro-blocks at microcode engine 260. The present invention provides for ordering the macro-blocks in raster scan order to support in-the-loop deblocking for video standards that support transmitting and receiving macro-blocks in non-raster scan order. Microcode engine 260 is configured to receive compressed data representing macro-blocks of a frame of a video stream. In one embodiment, at least one macro-block is received out-of-order. Microcode engine 260 is configured to buffer the compressed data and is configured to order the macro-blocks of the frame in raster scan order.

Figure 9:
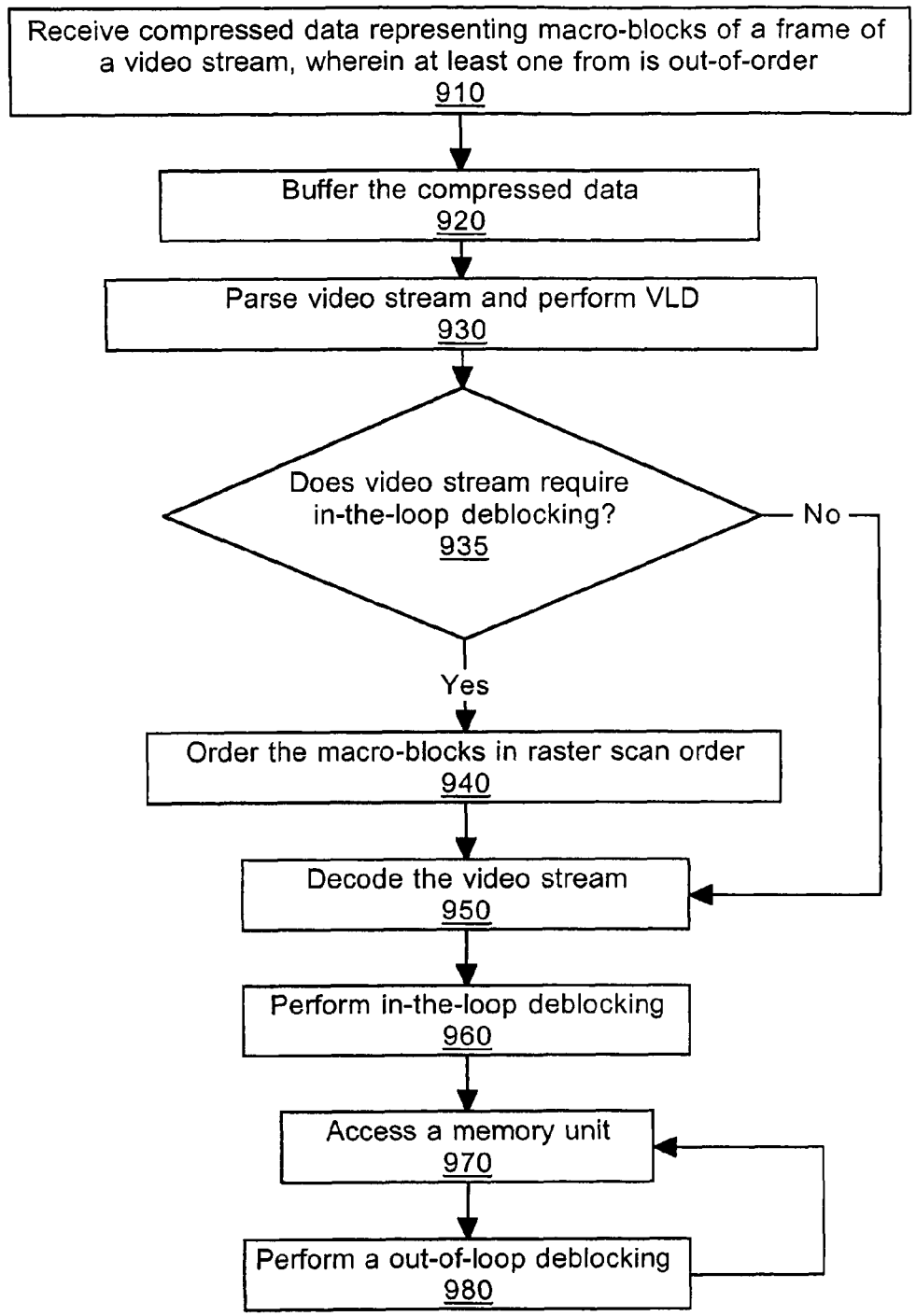
FIG. 9 illustrates a flow chart of a method for processing out-of-order macro-blocks of a video stream, in accordance with an embodiment of the present invention.

FIG. 9 illustrates a flow chart of a method 900 for processing out-of-order macro-blocks of a video stream, in accordance with an embodiment of the present invention. Although specific steps are disclosed in method 900, such steps are exemplary. That is, the embodiments of the present invention are well suited to performing various other steps or variations of the steps recited in FIG. 9. In one embodiment, method 900 is performed by microcode engine 260 of FIG. 2B.

At step 910 of method 900, compressed data representing macro-blocks of a frame of a video stream is received, wherein at least one macro-block is received out-of-order. At step 920, the compressed data is buffered. In one embodiment, the compressed data is buffered at a buffer of microcode engine 260. At step 930, the video stream is parsed and VLD is performed on the video stream. It should be appreciated that step 930 is optional, and that video stream parsing and VLD can be performed by the hardware decoder device. It should further be appreciated that other or additional pre-processing operations can be performed on the video stream at step 930.

At step 935, it is determined whether the video stream requires in-the-loop deblocking. In one embodiment, the compressed data includes an indication of whether in-the-loop deblocking is to be performed on the video stream. If in-the-loop deblocking is required, the macro-blocks of the frame are ordered in raster scan order, as shown at step 940. In one embodiment, all macro-blocks of a frame are buffered before the macro-blocks are ordered in raster scan order.

Method 900 then proceeds to step 950. Alternatively, if in-the-loop deblocking is not required, method 900 then proceeds directly to step 950.

At step 950, the video stream is decoded. In one embodiment, the macro-blocks are decoded in raster scan order. In one embodiment, the video stream is decoded by a hardware multi-standard video decoder device (e.g., decoder device 150 of FIG. 3 or decoder device 400 of FIG. 4). In one embodiment, the video stream is decoded according to method 500 of FIG. 5.

At step 960, macro-block-level in-the-loop deblocking is performed on a decoded macro-block. At step 970, the memory unit is accessed. In one embodiment, the deblocked and decoded video stream is stored in the memory for display.

At step 980, frame-level out-of-loop post-processing is performed on a decoded frame. In one embodiment, the out-of-loop post processing includes deblocking and deringing operations. It should be appreciated that step 980 is optional. Method 900 then returns to step 970, where the memory unit is accessed. In one embodiment, the deblocked, deringed and decoded video stream is stored in the memory for display.

By buffering the macro-blocks while the macro-blocks are still in compressed data, microcode engine 260 only needs to buffer a maximum of one frame of run length encoded compressed data which is a lot less than the decoded video data. Furthermore, buffering the compressed macro-blocks also saves power. Video streams received over the air are also subject to a lot of errors. Partitioning the bit stream parsing to microcode engine 260 also has the advantage of improving error recovery.

On-the-Fly Rotation of Macro-Blocks of a Video Stream

Embodiments of the present invention provide a rotation engine for rotating a video stream "on-the-fly," before the video stream is written to memory. Embodiments of the present invention are capable of rotating the video stream by rotating macro-blocks of a video stream as they are received and repositioning the macro-blocks within the frame based on the rotation. Embodiments of the present invention are capable of rotating video streams without requiring a second pass at the decoded frames by operating on macro-blocks at prior to writing the decoded macro-blocks to memory.

In one embodiment, the present invention provides a rotation engine configured for rotating a macro-block of a frame of the video stream according to a degree of rotation and for repositioning the macro-block to a new position within the frame, wherein the new position is based on the degree of rotation. In one embodiment, the video decoder device further includes a memory for storing the macro-block for display. In one embodiment, the rotation engine is configured to rotate the macro-block and to reposition the macro-block within the frame prior to accessing a memory.

Figure 10A:
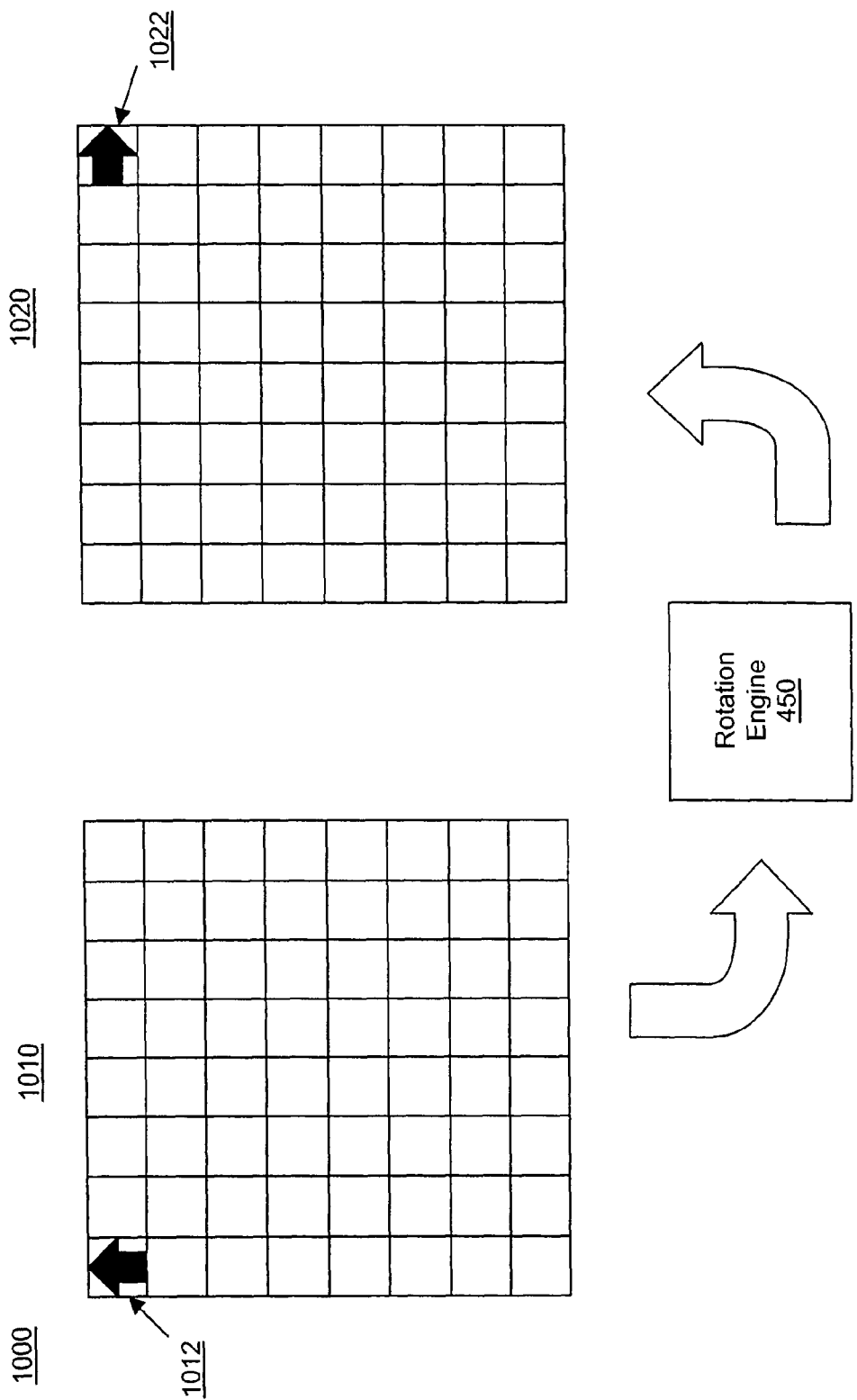
FIGS. 10A and 10B illustrate diagrams of the exemplary rotation of macro-blocks of frames, in accordance with embodiments of the present invention.
Figure 10B:
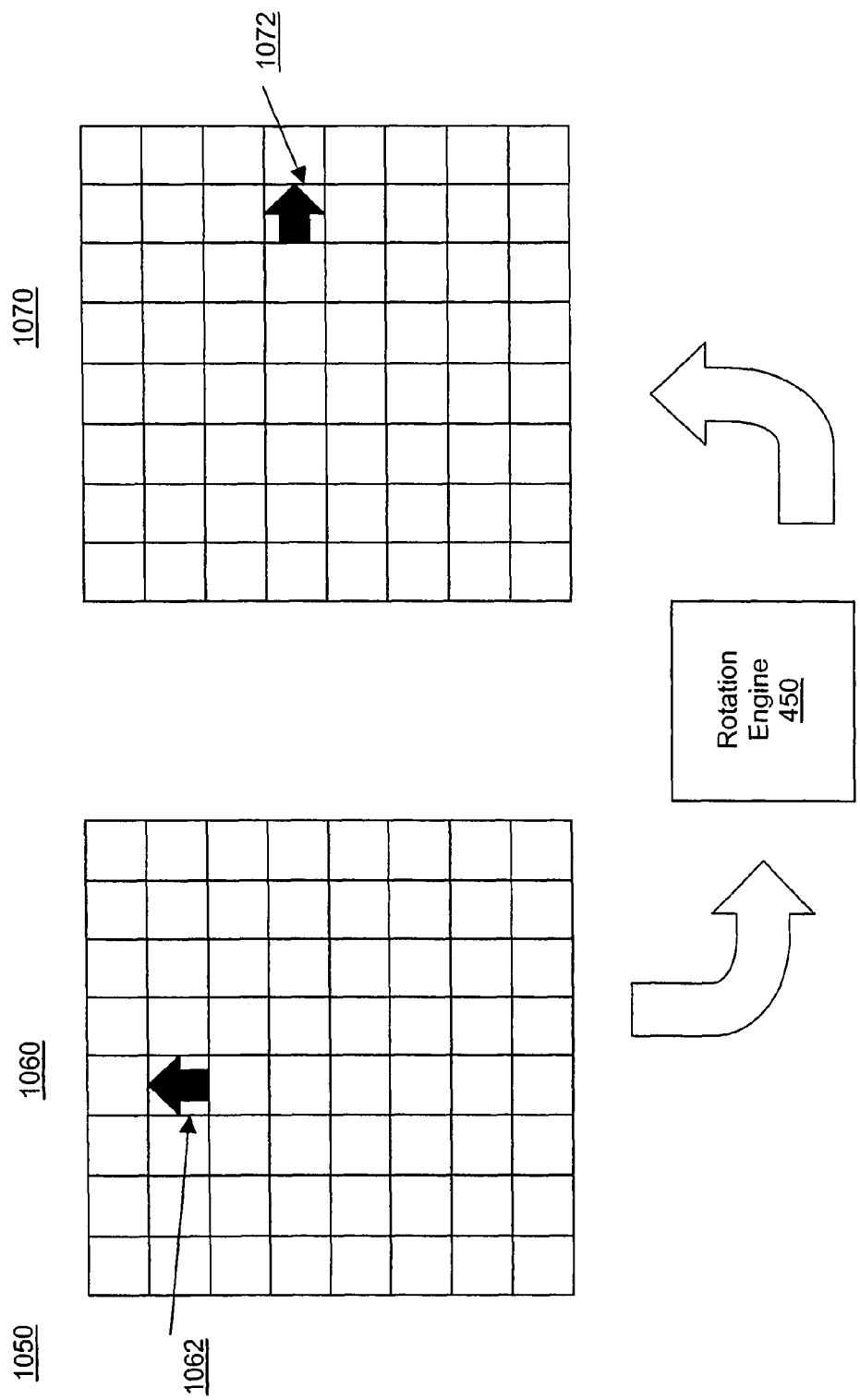

FIGS. 10A and 10B illustrate diagrams of the exemplary rotation of macro-blocks of frames, in accordance with embodiments of the present invention. While FIGS. 10A and 10B describe the operation of rotation engine 450 of FIG. 4, it should be appreciated that the described embodiments can be implemented within any type of video decoder device, and are not limited to the use of hardware multi-standard video decoder device 400 of FIG. 4. For instance, the rotation engine may be included within a single standard hardware decoder or a software decoder.

With reference to FIG. 10A, diagram 1000 illustrates the rotation of a frame 1010 using rotation engine 450 of FIG. 4. Frame 1010 includes many macro-blocks. Macro-block 1012 is shown as the first macro-block received at rotation engine 450. In one embodiment, the macro-blocks are received in raster scan order, in which macro-block 1012 is the first macro-block received, as it is the top-left macro-block.

Rotation engine 450 is configured to rotate macro-block 1012 and to reposition macro-block 1012 to a new position in frame 1010. The rotation and repositioning is based on a degree of rotation associated with the video stream. The degree of rotation indicates how the video stream is to be rotated. For example, the degree of rotation may be ninety-degrees clockwise, ninety-degrees counter-clockwise, one-hundred eighty degrees, or any other degree of rotation.

Diagram 1000 illustrates the operation of rotation engine 450 using a degree of rotation of ninety degrees clockwise. Macro-block 1012 is rotated ninety degrees clockwise. Rotation engine 450 also repositions macro-block 1012 such that rotated macro-block 1012, shown as macro-block 1022 in rotated frame 1020, is in the same position relative to all other macro-blocks of frame 1020.

Embodiments of the present invention also provide for rotating frames at the macro-block level where macro-blocks are received out-of-order. With reference to FIG. 10B, diagram 1050 illustrates the rotation of a frame 1060 using rotation engine 450 of FIG. 4. Macro-block 1062 is shown as the first macro-block received at rotation engine 450. In the present embodiment, the macro-blocks are not received in raster scan order, as macro-block 1062 is the first macro-block received but is not the top-left macro-block.

Rotation engine 450 is configured to rotate macro-block 1062 and to reposition macro-block 1062 to a new position in frame 1060. Diagram 1050 illustrates the operation of rotation engine 450 using a degree of rotation of ninety degrees clockwise. Macro-block 1062 is rotated ninety degrees clockwise. Rotation engine 450 also repositions macro-block 1062 such that rotated macro-block 1062, shown as macro-block 1072 in rotated frame 1070, is in the same position relative to all other macro-blocks of frame 1070.

Figure 11:
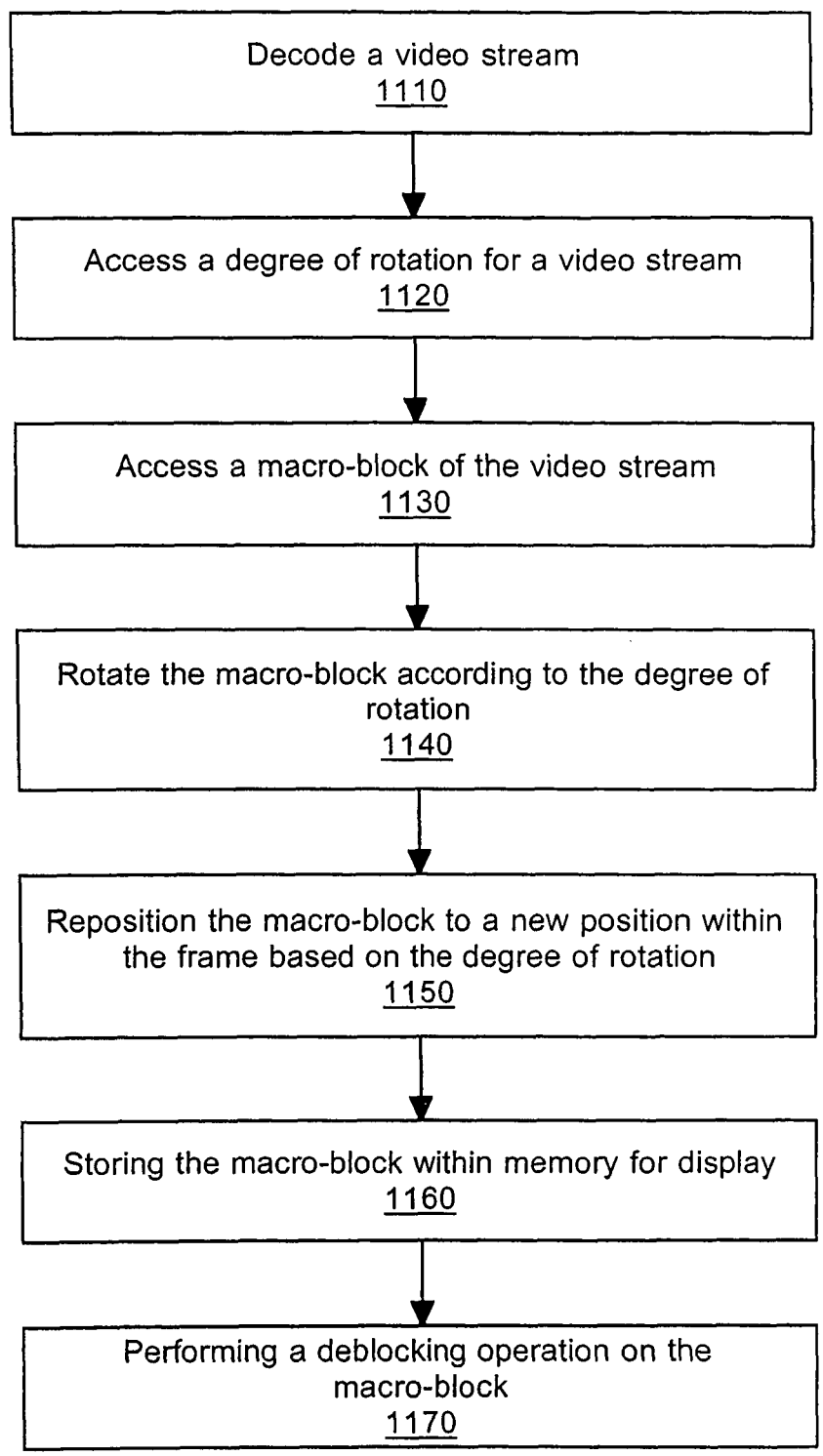
FIG. 11 illustrates a flow chart of a method for rotating macro-blocks of a frame, in accordance with an embodiment of the present invention.

FIG. 11 illustrates a flow chart of a method 1100 for rotating macro-blocks of a frame, in accordance with an embodiment of the present invention. Although specific steps are disclosed in method 1100, such steps are exemplary. That is, the embodiments of the present invention are well suited to performing various other steps or variations of the steps recited in FIG. 11. In one embodiment, method 1100 is performed by rotation engine 450 of FIG. 4.

At step 1110, a video stream is decoded. In one embodiment, the video stream is decoded by a hardware multi-standard video decoder device (e.g., decoder device 150 of FIG. 3 or decoder device 400 of FIG. 4). In one embodiment, the video stream is decoded according to method 500 of FIG. 5. It should be appreciated that step 1110 is optional, and that the video stream is already decoded prior to processing.

At step 1120, a degree of rotation for the video stream is accessed. In one embodiment, the degree of rotation is one of: ninety-degrees clockwise, ninety-degrees counter-clockwise, and one-hundred eighty degrees. However, it should be appreciated that any degree of rotation may be used. At step 1130, a macro-block of the video stream is accessed.

At step 1140, the macro-block is rotated according to the degree of rotation. At step 1150, the macro-block is repositioned to a new position within the frame, wherein the new position is based on the degree of rotation. It should be appreciated that the macro-block is repositioned such that the macro-block is in the same position relative to all other macro-blocks of frame once rotated. In one embodiment, the rotation of the macro-block and the repositioning of the macro-block are performed prior to accessing a memory.

At step 1160, the macro-block is stored within a memory for display. In one embodiment, as shown at step 1170, a deblocking operation is performed on the decoded macro-block. It should be appreciated that step 1170 is optional. Moreover, it should be appreciated that step 1170 can include performing in-the-loop deblocking or out-of-loop deblocking and deringing.

In this manner, embodiments of the present invention provide a new hardware multi-standard video decoder device architecture that supports hardware-based decoding of video streams according to multiple video standards. Embodiments of the present invention are capable of providing real-time decoding for each of the plurality of video encoding standards. Embodiments of the present invention provide post-processing operations on decoded video streams. One embodiment of the present invention provides a hardware decoder device that provides video decoding for video streams using any of the JPEG, MPEG-4, H.263, H.263+, H.264, and WMV9/VC-1 video standards.

Embodiments of the present invention provide a hardware multi-stream multi-standard video decoder device for providing concurrent video decoding functionality for a plurality of different video encoding standards. Embodiments of the present invention are capable of decoding multiple interleaved video streams at the same time.

Embodiments of the present invention provide a video decoder architecture for providing in-the-loop deblocking of a video stream without requiring additional memory for ordering the macro-blocks in raster scan order. Embodiments of the present invention are capable of ordering macro-blocks of the video stream in the microcode engine. Embodiments of the present invention are capable of providing decoding and out-of-loop deblocking and/or deringing for a video stream encoded using one of a plurality of supported video standards.

Embodiments of the present invention provide a rotation engine for rotating a video stream "on-the-fly," before the video stream is written to memory. Embodiments of the present invention are capable of rotating the video stream by rotating macro-blocks of a video stream as they are received and repositioning the macro-blocks within the frame based on the rotation. Embodiments of the present invention are capable of rotating video streams without requiring a second pass at the decoded frames by operating on macro-blocks at prior to writing the decoded macro-blocks to memory.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A video decoder architecture for processing out-of-order macro-blocks of a video stream, said video decoder architecture comprising:

a microcode engine for receiving compressed data representing macro-blocks of a frame of a video stream, wherein at least one macro-block is received out-of-order, wherein said microcode engine is operable to detect said at least one macro-block is received out-of-order, to buffer said compressed data in response to detecting said macro-block is out-of-order, to reorder said macro-blocks of said frame into raster scan order, and to send reordered macro-blocks in said raster scan order to a digital video decoder; and said digital video decoder for receiving said re-ordered macro-blocks in raster scan order and for decoding said macro-blocks, wherein said digital video decoder comprises circuitry that requires said macro-blocks to be received in said raster scan order in order to process said macro-blocks of said video stream.

2. The video decoder architecture of claim 1, wherein said digital video decoder comprises:

a command parser for accessing said video stream and for identifying a video encoding standard used for encoding said video stream; and a plurality of hardware decoding blocks for performing operations associated with decoding said video stream, wherein different subsets of said plurality of hardware decoding blocks are for decoding video streams encoded using different video encoding standards.

3. The video decoder architecture of claim 2, wherein said hardware multi-standard video decoder device further comprises an in-the-loop deblocking filter for performing a macro-block-level deblocking operation on a decoded macro-block.

4. The video decoder architecture of claim 3, wherein said microcode engine is operable to forward out-of-order macro-blocks to said digital video decoder if said video stream does not utilize said in-the-loop deblocking filter.

5. The video decoder architecture of claim 4, wherein said hardware multi-standard video decoder device further comprises an out-of-loop filter for performing a frame-level post-processing operation on a decoded frame.

6. The video decoder architecture of claim 1, wherein said video stream is encoded using H.264 video standard.

7. The video decoder architecture of claim 1, wherein said microcode engine is operable to parse said video stream and to perform Variable Length Decoding (VLD) on said video stream.

8. A method for processing out-of-order macro-blocks of a video stream, said method comprising:

receiving compressed data representing macro-blocks of a frame of a video stream, wherein at least one macro-block is received out-of-order;

detecting said at least one macro-block is received out-of-order;

buffering said compressed data in response to detecting said macro-block is out-of-order;

ordering said macro-blocks of said frame in raster scan order, wherein said macro-blocks are compressed, said ordering performed by a microcode unit;

sending reordered macro-blocks in said raster scan order to a decoder unit; and decoding using said decoder unit said compressed data representing said macro-blocks reordered in said raster scan order, wherein said decoder unit is a separate component from said microcode unit.

9. The method as recited in claim 8 wherein said decoding said compressed data representing said macro-blocks in said raster scan order comprises:

identifying a video standard used for encoding said video stream;

determining a subset of hardware decoding blocks of a plurality of hardware decoding blocks of said hardware multi-standard video decoder device used for decoding said video stream, wherein different subsets of said plurality of hardware decoding blocks are operable for decoding video streams encoded using different video encoding standards; and decoding said video stream using said subset of hardware decoding blocks.

10. The method as recited in claim 9 further comprising performing a macro-block-level in-the-loop deblocking operation on a decoded macro-block.

11. The method as recited in claim 8 further comprising performing a frame-level out-of-loop post-processing operation on a decoded frame.

12. The method as recited in claim 8 wherein said video stream is encoded using H.264 video standard.

13. The method as recited in claim 8 further comprising:
parsing said video stream; and
performing Variable Length Decoding (VLD) on said video stream.

14. A video stream decoder comprising:
a printed circuit board;
a connector coupled to said printed circuit board, said connector for removably coupling said video stream decoder to a computer system; and
an integrated circuit coupled to said printed circuit board and coupled to said connector, said integrated circuit comprising:
a microcode engine for receiving compressed data representing macro-blocks of a frame of a video stream, wherein at least one macro-block is received out-of-order, wherein said microcode engine is operable to detect said at least one macro-block is received out-of-order, to buffer said compressed data in response to detecting said macro-block is out-of-order, and to reorder said macro-blocks of said frame into raster scan order and to send reordered macro-blocks in said raster scan order to a digital video decoder,
said digital video decoder for receiving said macro-blocks in raster scan order and for decoding said macro-blocks, wherein said digital video decoder comprises circuitry that requires said macro-blocks to be received in said raster scan order in order to process said macro-blocks of said video stream.

15. The video stream decoder of claim 14, wherein said digital video decoder comprises:
a command parser for accessing said video stream and for identifying a video encoding standard used for encoding said video stream; and
a plurality of hardware decoding blocks for performing operations associated with decoding said video stream, wherein different subsets of said plurality of hardware decoding blocks are for decoding video streams encoded using different video encoding standards.

16. The video stream decoder of claim 15, wherein said hardware multi-standard video decoder device further comprises an in-the-loop deblocking filter for performing a macro-block-level deblocking operation on a decoded macro-block.

17. The video stream decoder of claim 16, wherein said microcode engine is operable to forward out-of-order macro-blocks to said digital video decoder if said video stream does not utilize said in-the-loop deblocking filter.

18. The video stream decoder of claim 17, wherein said hardware multi-standard video decoder device further comprises an out-of-loop filter for performing a frame-level post-processing operation on a decoded frame.

19. The video stream decoder of claim 14, wherein said video stream is encoded using H.264 video standard.

20. The video stream decoder of claim 14, wherein said microcode engine is operable to parse said video stream and to perform Variable Length Decoding (VLD) on said video stream.

21. The video stream decoder of claim 14, wherein said microcode engine is configured to reorder said macro-blocks of said frame into raster scan order upon buffering each of said macro-blocks of said frame.

22. The video decoder architecture of claim 1, wherein said digital video decoder is a hardware multi-standard video decoder device.

23. The method as recited in claim 8, wherein said decoder unit comprises a hardware multi-standard video decoder device.

24. The video stream decoder of claim 14, wherein said digital video decoder is a hardware multi-standard video decoder device.

* * * * *